(12) United States Patent
Stelman

(10) Patent No.: US 6,683,949 B1
(45) Date of Patent: Jan. 27, 2004

(54) HANDSET PORT INTERFACE INCLUDING DC MEASUREMENT AND TRANSMIT PATH CALIBRATION

(75) Inventor: Bruce W. Stelman, San Jose, CA (US)

(73) Assignee: Hello Direct, Inc., San Jose, CA (US)

( * ) Notice: Subject to any disclaimer, the term of this patent is extended or adjusted under 35 U.S.C. 154(b) by 0 days.

(21) Appl. No.: 09/340,541

(22) Filed: Jun. 28, 1999

Related U.S. Application Data

(60) Provisional application No. 60/092,102, filed on Jul. 8, 1998.

(51) Int. Cl.[7] .............................. H04M 1/00; H04M 9/00
(52) U.S. Cl. ............................ 379/387.01; 379/388.06; 379/394
(58) Field of Search ..................... 379/387.01, 388.02, 379/388.03, 388.06, 390.02, 390.03, 394, 395.01

(56) References Cited

U.S. PATENT DOCUMENTS

| | | | |
|---|---|---|---|
| 5,206,898 A | 4/1993 | Nishijima | 379/90 |
| 5,241,590 A | 8/1993 | Deakins et al. | 379/356 |
| 5,555,300 A | 9/1996 | Gutzmer | 379/395 |
| 5,729,603 A | 3/1998 | Huddart et al. | 379/387 |
| 5,912,964 A | 6/1999 | Stelman | 379/387 |
| 6,128,384 A | * 10/2000 | Papadopoulos et al. | |

FOREIGN PATENT DOCUMENTS

EP  0 459 405 A2  * 12/1991

* cited by examiner

*Primary Examiner*—Duc Nguyen
(74) *Attorney, Agent, or Firm*—Haverstock & Owens LLP

(57) ABSTRACT

A handset port interface including DC measurement and transmit path calibration. In an interface device for interfacing a telephone instrument, such as a headset, a handset, a modem, or a teleconferencing device, to the handset microphone input port of a telephone set base unit, the transmit signal level applied to the microphone input of the base unit must be set to an appropriate level. The appropriate level is determined according to the type of microphone the telephone set base unit is configured to interface with. The microphone can be carbon, electret or dynamic. The interface device detects the type of microphone the base unit is configured to interface with by detecting the DC characteristics of the microphone input port. Then, the interface device determines the appropriate transmit level by correlating the DC characteristics to one of a plurality of predetermined transmit levels. These levels are stored in a table. The transmit signal level is then automatically set according to a selected one of the predetermined transmit levels. Alternately, a test signal is applied to the microphone port of the base unit to determine its input characteristics and, then, the transmit sensitivity is set based upon this determination. A test signal can alternately be applied to the microphone located in the handset to determine its type or characteristics and, then, the transmit sensitivity is set based upon this determination. As an enhancement, receive sensitivity is adjusted for signals received from a handset speaker output port.

34 Claims, 5 Drawing Sheets

HANDSET PORT INTERFACE INCLUDING DC MEASUREMENT AND TRANSMIT PATH CALIBRATION

This application claims the benefit of U.S. Provisional Application Ser. No. 60/092,102, filed Jul. 8, 1998.

FIELD OF THE INVENTION

This invention relates to the field of telephony. More particularly, this invention relates to an adaptive interface for interfacing a telephone instrument, such as a headset, a handset, a modem, a fax modem, a facsimile machine or a teleconferencing device, to telephone set through a four-wire handset port of the telephone set.

BACKGROUND OF THE INVENTION

A two-wire telephone set includes a base unit connected to a central office of a telephone service provider via a bidirectional two-wire telephone line and also includes a handset connected to the telephone base via a four-wire handset cable. The handset cable has four wires because, for two-way voice communication, the handset includes both a microphone and a speaker, each of which requires a pair of wires. Each pair of wires of the handset cable communicates a uni-directional signal. Typically, the telephone base supplies audio signals to the speaker and a DC biasing voltage to the microphone, while the telephone base receives audio signals from the microphone. A two-wire to four-wire converter included in the telephone set converts the bi-directional central office signals into the four handset signals. In addition, the telephone set includes a ring detector for detecting an AC ring signal provided by the central office and a hook-switch for signalling the central office of the on-hook/off-hook status of the telephone set. The hook-switch controls draw of DC current from the central office by the telephone set, which is sensed by the central office.

Business organizations often utilize a private branch exchange (PBX) for providing telephone service to telephone users within the organization. Telephones located on the desks of the users are each connected to the PBX while the PBX is connected to a telephone service provider via one or more outside lines. The PBX typically includes capability for appropriately connecting incoming calls to the user telephone sets and for connecting outgoing calls from a user telephone set to an outside line. In this way, fewer than one outside line per user telephone is needed, thus, reducing the cost of the telephone service. In addition, the PBX typically provides a variety of features to the users of the PBX, such as connecting calls among the users and providing voicemail services.

To implement all of the functions of the PBX, certain control and overhead communications must take place between each user's telephone set and the PBX. These communications typically include digital status and command signals in addition to the two-way voice signals necessary to carry on a telephone conversation. For example, the PBX must know whether a telephone set is connected to a particular extension in order to know whether or not to route calls to that extension. As another example, the PBX must interact with the user telephone sets in order for the users to initiate and terminate telephone calls and to access voicemail and other features of the PBX.

In general, the protocol utilized for control and overhead communications differs among the various manufacturers of PBXs. In addition, the voice signals can be digitally sampled and compressed according to various different companding schemes (e.g., $\mu$-law or A-law). Therefore, a two-wire analog telephone instrument, such as modem, fax modem, facsimile machine or teleconferencing device, cannot generally interface directly with the PBX without a dedicated analog port from the PBX.

This creates a problem for users of a PBX who wish to use universally available analog telephone instruments, such as modems, fax modems, facsimile machines, teleconferencing devices, headsets or handsets, in addition to their PBX-compatible telephone sets. This problem has intensified by a recent increase in demand for access to the world wide web, which is typically accessed through use of a modem connected to a personal computer. A proposal has been to provide a dedicated outside line for each such analog telephone instrument. This solution is not entirely satisfactory, however, because it negates the savings which result from the PBX limiting the number of required outside lines. Another solution has been to provide an analog line card in the PBX and a separate line connecting the two-wire analog telephone instrument to the PBX. This solution can be costly due to the need to install separate extension lines to connect each of the PBX-compatible telephone set and the analog telephone instrument to the PBX. Further, the addition of analog line cards can necessitate a PBX that is has a higher capacity, and hence, higher cost, that would otherwise be required.

Another solution has been to provide a device which interfaces a modem with a telephone set through the handset port of the telephone set. For example, U.S. Pat. No. 4,907,267 discloses a modem interface device for use with a telephone set having a base unit and a handset. The telephone set can be a two-wire telephone set or a telephone set designed for use with a PBX. To use the modem interface device, the handset is unplugged from the handset jack of the base and plugged into a handset jack in one end of the device. Extending from the device is a four-wire cable which is connected to the handset jack of the base. The device also includes a modular jack for accepting a two-wire cable which connects the device to a two-wire telephone instrument, such as a modem. A series of switches are manually positioned to select between voice and data communications and to configure the interface device to match the signalling characteristics of the particular telephone set being used.

The manually operable switch arrangement described in U.S. Pat. No. 4,907,267 is improved upon in two products manufactured by Unlimited Systems Corp. of San Diego, Calif. A first of these products, the "KONEXX Office Konnector," connects to the base of a telephone set and to the handset to provide an interface for a two-wire telephone, facsimile machine or modem. The device detects when the two-wire telephone, facsimile machine or modem is placed off-hook for switching between voice and data communications. A second of the these products, the "KONEXX Konference," is similarly connected between the base and handset, but provides an interface for a teleconferencing device. For each of these devices, a manually operable switch is positioned in one of four positions for adjusting the device to the signalling characteristics of the particular telephone set being used.

A drawback to the aforementioned interface devices is that the switch positions may be incorrectly set. In addition, there is a likelihood of encountering a telephone set having signalling characteristics that cannot be met by these interface devices. For example, the bias voltage level and AC signal coupling characteristics of the microphone connection to the telephone base can vary from manufacturer to manufacturer as well as the output impedance and signal levels provided via the handset speaker connection. Also, the wire assignments within the handset cable can vary. A single return may be provided for both the microphone and speaker or each may have two dedicated wires. Failure of an interface device to properly match the signalling characteristics of the telephone set may result in inoperability or lost data and may result in the frustration of users of such devices who may not have the technical ability, nor the inclination, to resolve such problems.

What is needed is a telephone handset interface that has sufficient flexibility to match the signalling characteristics of a wide variety of commercially available telephone sets while minimizing technical ability required from a user of such interface.

SUMMARY OF THE INVENTION

The invention is a handset port interface including DC measurement and transmit path calibration. In an interface device for interfacing a telephone instrument, such asia headset, a handset, a modem, or a teleconferencing device, to the handset microphone input port of a telephone set base unit, the transmit signal level applied to the microphone input of the base unit must be set to an appropriate level. In accordance with the present invention, the appropriate level is determined according to the type of microphone the telephone set base unit is configured to interface with. For example, the microphone can be carbon, electret or dynamic. The interface device detects the type of microphone the base unit is configured to interface with by detecting the DC characteristics of the microphone input port. Then, the interface device determines the appropriate transmit level by correlating the DC characteristics to one of a plurality of predetermined transmit levels. These levels can be stored in a table. The transmit signal level is then automatically set according to a selected one of the predetermined transmit levels.

In accordance with an aspect of the present invention, a method of interfacing a telephone instrument to a handset port of a telephone set comprises steps of: identifying a type of microphone the telephone set is configured to interface with; correlating the microphone type to an appropriate transmit level for signals transmitted from the telephone instrument to the telephone set via a transmit path; and calibrating the transmit path in accordance with the appropriate transmit level.

In accordance with another aspect of the present invention, an interface apparatus for interfacing a telephone instrument to a handset port of a telephone set comprises: a handset port interface for interfacing to a handset port of a telephone set wherein the handset port includes a microphone input; a telephone instrument interface for interfacing to a telephone instrument; a transmit path for communicating signals from the telephone instrument interface to the handset port interface; and a controller for detecting a DC characteristic of the microphone input of the handset port and for adjusting a transmit sensitivity of the transmit path according to the DC characteristic.

In a first alternate embodiment, a test signal is applied to the microphone port of the base unit to determine its input characteristics and, then, the transmit sensitivity is set based upon this determination. In accordance with an aspect of the first alternate embodiment of the present invention, an interface apparatus for interfacing a telephone instrument to a handset port of a telephone set comprises: a handset port interface for interfacing to a handset port of a telephone set wherein the handset port includes a microphone input; a telephone instrument interface for interfacing to a telephone instrument; a transmit path for communicating signals from the telephone instrument interface to the microphone input of the handset port interface; and a controller for applying a test signal to the microphone input of the handset port interface and for measuring a response to the test signal at the microphone input of the handset port interface wherein the controller adjusts a transmit sensitivity of the transmit path according to the response to the test signal.

In accordance with another aspect of the first alternate embodiment of the present invention, an interface apparatus for interfacing a telephone instrument to a handset port of a telephone set comprises: a handset port interface for interfacing to a handset port of a telephone set wherein the handset port includes a microphone input; a telephone instrument interface for interfacing to a telephone instrument; a transmit path for communicating signals from the telephone instrument interface to the microphone input of the handset port interface; a controller for applying a test signal to the microphone input of the handset port interface and for measuring a response to the test signal; and a table wherein the table stores a plurality of predetermined transmit sensitivity levels, each predetermined transmit sensitivity level stored in association with a corresponding possible response to the test signal wherein the controller selects a transmit sensitivity for the transmit path locating an entry in the table corresponding to the response to the test signal.

In a second alternate embodiment, a test signal is applied to the microphone located in the handset to determine its type or characteristics and, then, the transmit sensitivity is set based upon this determination. In accordance with an aspect of the second alternate embodiment of the present invention, an interface apparatus for interfacing a telephone instrument to a handset port of a telephone set comprises: a handset port interface for interfacing to a handset port of a telephone set wherein the handset port includes a microphone input; a telephone instrument interface for interfacing to a telephone instrument; a transmit path for communicating signals from the telephone instrument interface to the microphone input of the handset port interface; a handset interface for interfacing to a handset having a microphone; and a controller for applying a test signal to the microphone of the handset and for measuring a response to the test signal wherein the controller adjusts a transmit sensitivity of the transmit path according to the response to the test signal.

As a further enhancement to the aforementioned embodiments, receive sensitivity can be adjusted for signals received from a handset speaker output port.

DETAILED DESCRIPTION OF A PREFERRED EMBODIMENT

Figure 1:
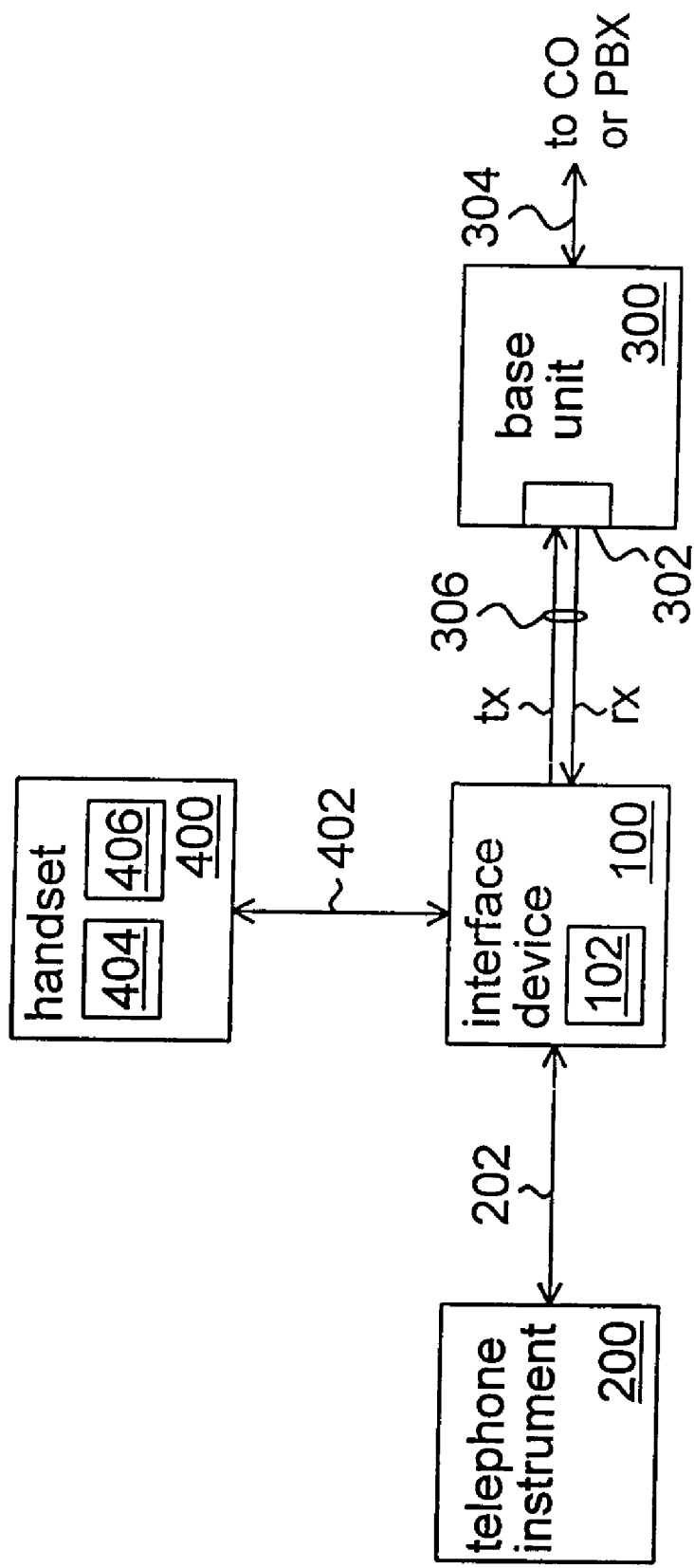
FIG. 1 illustrates an interface device in accordance with the present invention coupled between a handset port of a telephone base unit and its associated handset and coupled to, a telephone instrument for interfacing the telephone instrument to the telephone base unit.

FIG. 1 illustrates an interface device 100 in accordance with the present invention coupled between a handset port 302 of a telephone base unit 300 and its associated handset 400 and coupled to a telephone instrument 200 for interfacing the telephone instrument 200 to the telephone base unit 300. The telephone base unit 300 can be coupled to a telephone system (not shown), such as a central office (CO) of a telephone service provider or to a private branch exchange (PBX) via extension line 304.

Conventionally, the handset 400 is configured to be plugged into to the handset port 302 of the telephone base unit 300 (FIG. 1) via a handset cable 402. The handset port 302 includes a four-wire interface for the handset 400. Accordingly, handset port 302 includes a transmit pair of terminals (microphone input) for accommodating transmissions to the telephone base unit 300 from a microphone 404 included in the telephone handset 400, and a receive pair of terminals (speaker output) for accommodating signals from the telephone base unit 300 intended for a speaker 406 included in the handset 400. Similarly, the handset cable 402 includes a transmit pair and a receive pair. It will be apparent, however, that the transmit pair and the receive pair of the handset port 302 and the handset cable 402 can include a common return. The microphone 404 can be carbon, electret or dynamic. The telephone base unit 300 provides DC power to the microphone 404 via the transmit pair, depending upon the type of microphone 404.

In accordance with the present invention, the handset 400 and the handset cable 402 are removed from the handset port 302 and, instead, the interface device 100 is plugged into the handset port 302 via a cable 306. The cable 306 includes a transmit pair for coupling the interface device 100 to the transmit pair of the handset port 302 and a receive pair for coupling the interface device 100 to the receive pair of the handset port 302. The cable 306 can include a common return. Preferably, though not necessarily, the handset 400 and handset cable 402 are plugged into the interface device 100 so that the handset 400 can be utilized when the telephone instrument 200 is not in use.

The telephone instrument 200 is coupled to the interface device 100 via a cable 202. The telephone instrument 200 can be, for example, a headset, a handset, a modem, a facsimile device, a fax modem, or a teleconferencing device. Assuming that the telephone instrument 200 is configured for a bi-directional interface, the cable 202 includes a bi-directional pair for coupling the telephone instrument 200 to the interface device 100. Alternately, assuming the telephone instrument 200 includes a four-wire interface, the cable 202 include four wires (or possibly three, if a common return is utilized) for coupling the telephone instrument to the interface device 100.

Signals to be transmitted from the telephone instrument 200 to the telephone system are sent via the interface device 100 and the telephone base unit 300. The interface device 100 calibrates a transmit path between the telephone instrument 200 and the telephone base 300 by appropriately adjusting a transmit level (sensitivity) for the transmitted signals. An appropriate level of adjustment preferably maintains the transmitted signal within a range of signal levels expected by the telephone base unit 300. The appropriate level is determined according to the type of microphone 404 the base unit 300 is designed to interface with. As mentioned, the microphone 404 can be carbon, electret or dynamic. In accordance with a preferred embodiment of the present invention, the interface device 100 detects the type of microphone 404 the base unit 300 is designed to interface with by detecting one or more DC characteristics of the transmit pair (microphone input) at the handset port 302. Then, the interface device 100 determines the appropriate transmit level by correlating the DC characteristics to one of a plurality of predetermined transmit levels. These levels can be stored in a table 102 within the interface device 100. The table 102 preferably stores a plurality of predetermined transmit sensitivity levels, each stored in association with corresponding DC characteristics. The interface device 100 looks up the DC characteristics in the table 102 and selects the corresponding transmit level. The level for the transmitted signal is then set automatically by the interface device 100 according to a selected one of the predetermined transmit levels.

Figure 2:
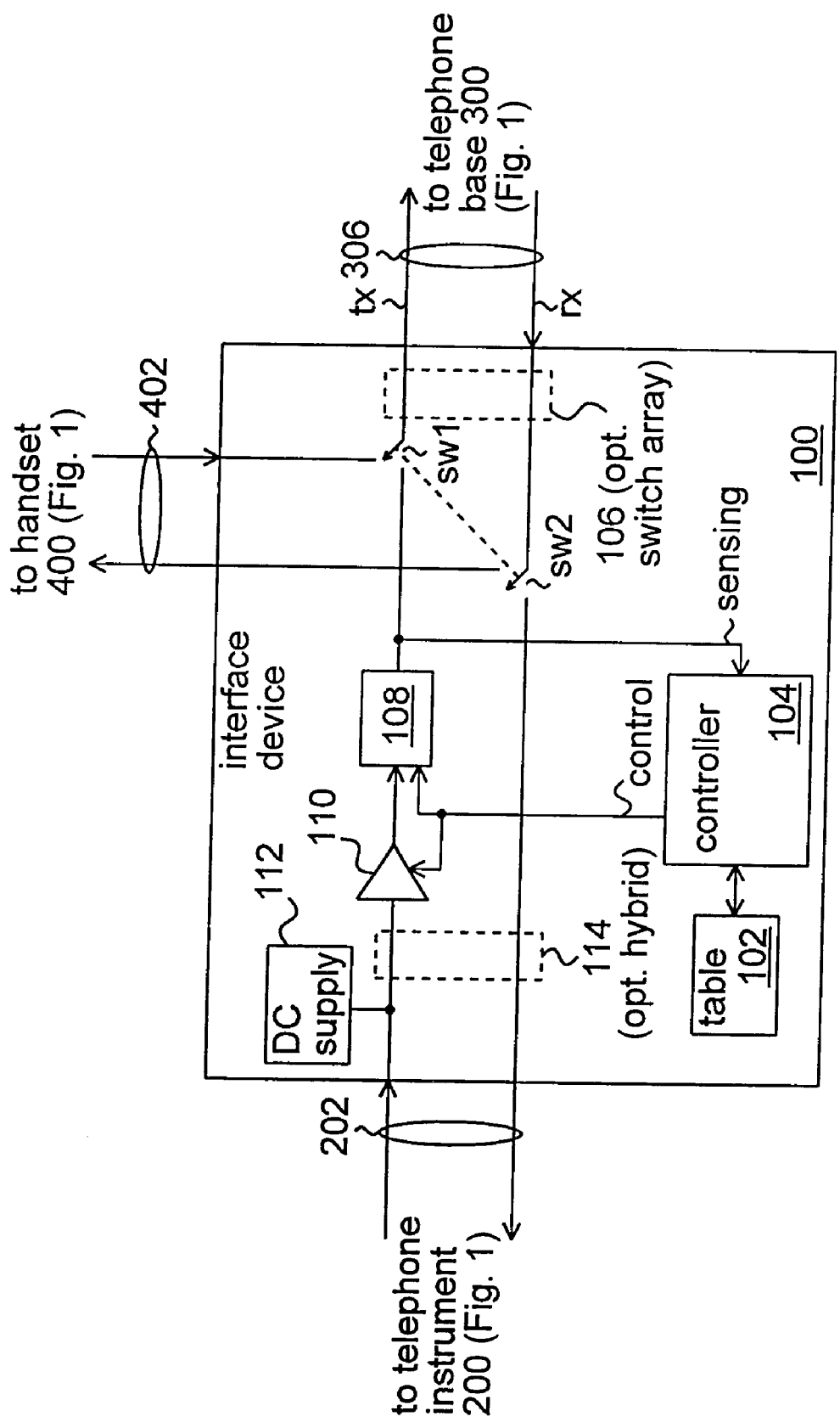
FIG. 2 illustrates a schematic block diagram of the interface device in accordance with the present invention.

FIG. 2 illustrates a schematic block diagram of the interface device 100 in accordance with a preferred embodiment of the present invention. The transmit pair of the cable 306 is coupled to a first terminal of a switch sw1. The receive pair of the cable 306 is coupled to a first terminal of a switch sw2. Although the switches sw1 and sw2 are each illustrated as a single switch, it will be apparent that the switches sw1 and sw2 operate to appropriately switch a signal carrying line and a return line for each of the transmit pair and the receive pair of the cable 306.

A second terminal of the switch sw1 is coupled to the transmit pair of the handset cable 402, while a second terminal of the switch sw2 is coupled to the receive pair of the handset cable 402. The switches sw1 and sw2 are operated together such that in a first position, the transmit pair and the receive pair of the handset port 302 (FIG. 1) of the telephone base unit 300 (FIG. 1) are operatively coupled to the microphone 404 (FIG. 1) and the speaker 406 (FIG. 1), respectively, of the handset 400. Under these conditions, the handset can be used normally in conjunction with the telephone base unit 300.

A third terminal of the switch sw1 is coupled via an optional cross-point switch array 106 to a sensing terminal of a controller 104 and to an output terminal of an adjustable impedance 108. An input terminal of the adjustable impedance 108 is coupled to an output terminal of an adjustable amplifier 110. An input terminal of the adjustable amplifier 110 is coupled to a DC supply 112 and to the telephone instrument 200 (FIG. 1) via the cable 202. The adjustable amplifier 110 and the adjustable impedance 108 are controlled by the controller 104. The DC supply 112 provides power for operating the telephone instrument 200 (FIG. 1), if necessary. A third terminal of the switch sw2 is coupled to the telephone instrument 200 (FIG. 1) via the optional cross-point switch array 106 and via the cable 202.

The cross-point switch array 106 can be utilized to ensure that the correct terminals of the handset port 302 (FIG. 1) are coupled to the transmit pair and receive pair within the interface device 100. Accordingly, telephone sets having various different terminal assignments for the handset port 302 are accommodated. Preferably, the cross-point switch array is configured under control of the controller 104. Appropriate settings for the cross-point switch array can be determined by the controller searching pairs of terminals of the handset port 302 (FIG. 1) for a DC biasing voltage supplied to the microphone 404 by the telephone base unit 300 (FIG. 1) and/or by searching for a dial tone provided to the speaker 406 by the base unit 300. Alternately, the cross-point switch array 106 can be omitted from the interface device 100 with some loss in versatility.

Assuming the telephone instrument 200 (FIG. 1) is a four-wire device, the third terminal of the switch sw2 is coupled to a receive pair of the telephone instrument 200 while the input of the adjustable amplifier 110 is coupled to a transmit pair of the telephone instrument 200. Alternately, however, assuming the telephone instrument 200 is a two-wire device, a two-to-four wire converter (optional hybrid) 114 is coupled between the telephone instrument 200, the input of the adjustable amplifier 112 and the switch sw2 for providing appropriate conversion to the bi-directional signals of the telephone instrument 200 and the uni-directional signals of the handset port 302 (FIG. 1) of the telephone base unit 300 (FIG. 1).

Accordingly, when the switches sw1 and sw2 are in a second position, the transmit and receives pairs of the handset port 302 (FIG. 1) are operatively coupled to the telephone instrument 200. The transmit pair is coupled to the telephone instrument via the adjustable amplifier 110 and via the adjustable impedance 108.

The controller 104 controls operation of the interface device 100. When the switches sw1 and sw2 are placed in the second position, the controller 104 measures the DC characteristics of the transmit pair of the handset port 302 via the sensing terminal of the controller 104. For example, the controller 104 measures the voltage and/or impedance at the transmit pair of the handset port 302. The value or values.obtained by these DC measurements are expected to uniquely identify the type of microphone 404 the telephone base unit 300 is configured to interface with. Once the controller 104 makes the DC measurements, the controller 104 compares the values obtained to entries in the table 102. As mentioned, the table 102 preferably stores a plurality of predetermined transmit sensitivity levels for the adjustable amplifier 110, each stored in association with corresponding DC characteristics. The controller 104 looks up the DC characteristics in the table 102 and selects the corresponding transmit level. The signal level for the transmitted signal is then set automatically by the controller 104 according to a selected one of the predetermined transmit levels.

In addition, because an impedance for each of the various possible microphone types can differ, the table 102 also preferably stores appropriate impedance settings for adjusting the impedance 108 to an appropriate value. Each entry in the table 102, therefore, preferably includes a transmit level and an impedance setting stored in association with corresponding DC characteristics. In the preferred embodiment, the impedance 108 and the amplifier 110 are adjusted infrequently (e.g., only when the interface device 100 is instructed to do so in response to input from a user or only upon powering up the interface device 100), so as to avoid unnecessary calibration operations.

The switches sw1 and sw2 can be operated manually by a user of the interface device 100. Alternately, the switches sw1 and sw2 can be operated automatically by the controller 104. In which case, the switches are normally in the first position so as to operatively couple the handset 400 to the base unit 300. The controller 104 senses when current is drawn from the DC supply 112 which would indicate that the telephone instrument 200 is off hook. In response, the controller 104 conditions the switches sw1 and sw2 to operatively couple the telephone instrument 400 to the base unit 300.

Figure 3:
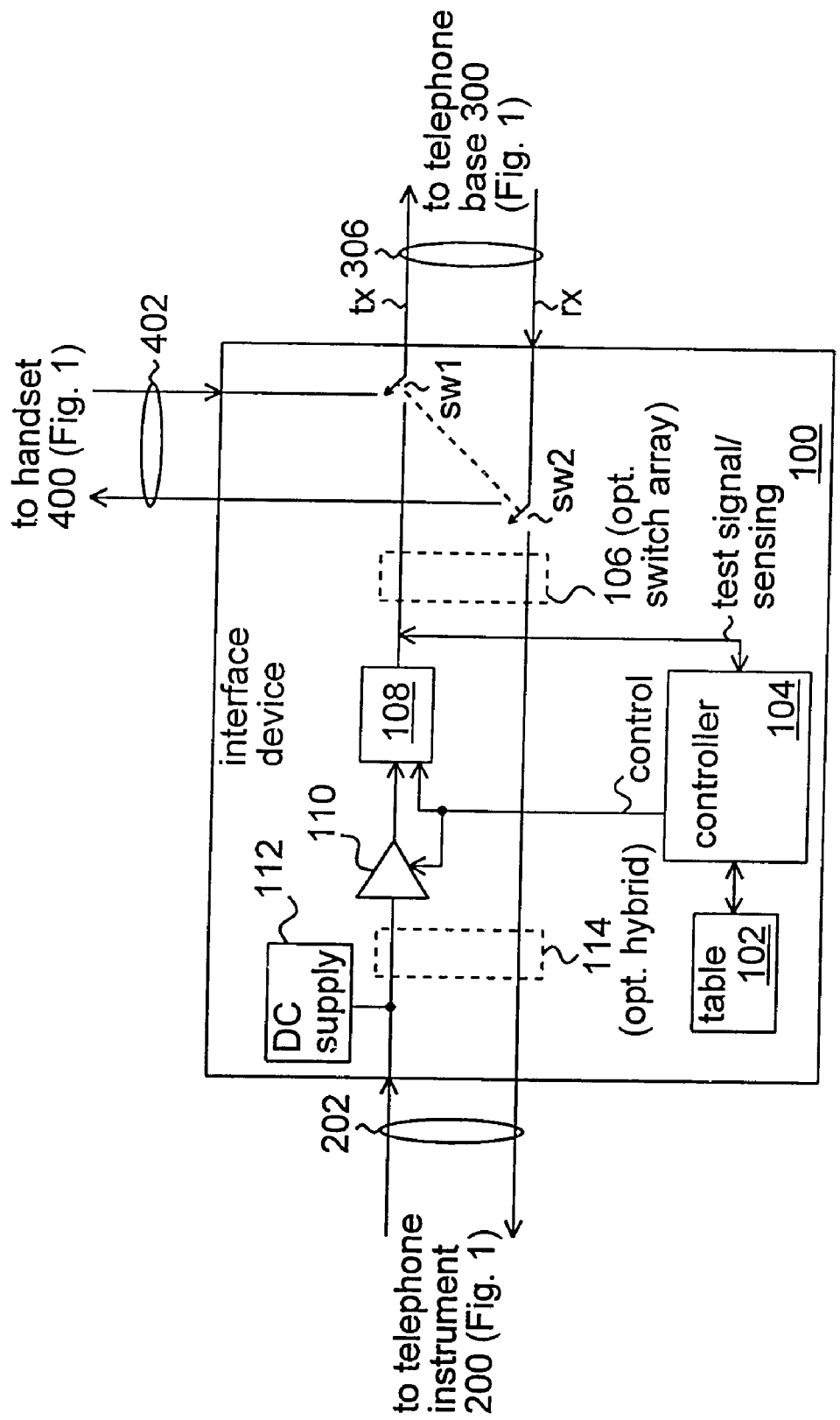
FIG. 3 illustrates a schematic block diagram of the interface device in accordance with a first alternate embodiment of the present invention.

FIG. 3 illustrates a schematic block diagram of the interface device in accordance with a first alternate embodiment of the present invention. In accordance with the first alternate embodiment, a test signal is applied to the microphone input of the handset port 302 (FIG. 1) of the telephone base unit 300 (FIG. 1) to determine one or more input characteristics of the telephone base unit 300 and, then, the transmit sensitivity is set based upon this determination. These input characteristics are expected to indicate the type of microphone the telephone base unit 300 is configured to interface with.

Referring to FIG. 3, the test signal generated by the controller 104 is applied to the transmit pair at the output of the adjustable impedance 108. In addition, a response to this test signal is measured by the controller 104 at the transmit pair of the handset port 302 (FIG. 1). The response to the test signal is an indication of the input characteristics of the microphone input of the handset port 302 (FIG. 1). A plurality of possible input characteristics are stored in the table 102, each in association with a corresponding transmit level and, preferably, a corresponding impedance setting. Once the controller 104 locates an entry in the table for measured input characteristics, the corresponding transmit level is utilized for adjusting the adjustable amplifier 110 and the corresponding impedance setting is utilized for setting the value of the adjustable impedance 108.

Figure 4:
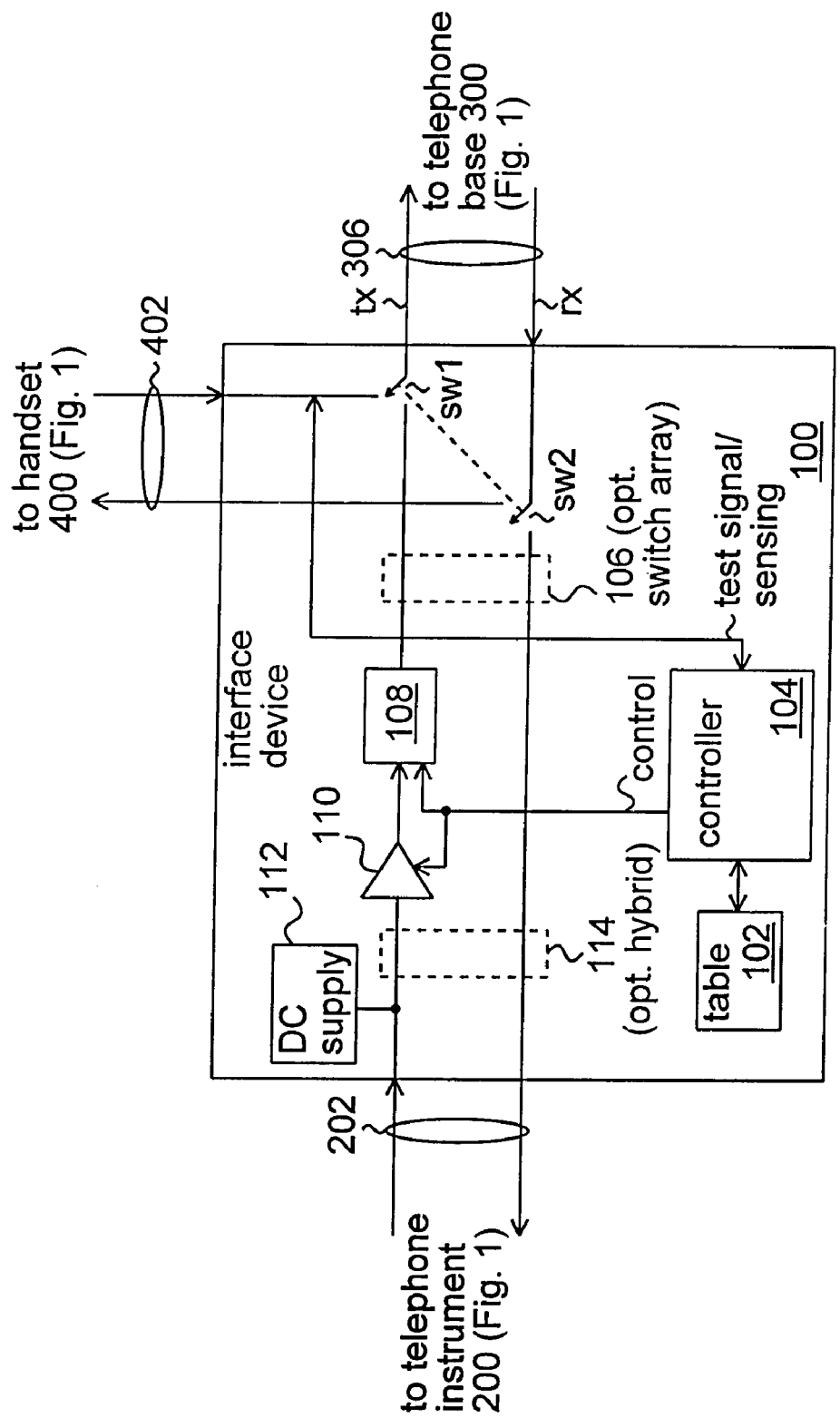
FIG. 4 illustrates a schematic block diagram of the interface device in accordance with a second alternate embodiment of the present invention.

FIG. 4 illustrates a schematic block diagram of the interface device in accordance with a second alternate embodiment of the present invention. In accordance with the second alternate embodiment, a test signal is applied to the microphone 404 (FIG. 1) located in the handset 400 to determine its type or one or more characteristics of the microphone and, then, the transmit sensitivity is set based upon this determination.

Referring to FIG. 4, the test signal generated by the controller 104 is applied to the transmit pair of the handset 400 (FIG. 1). In addition, a response to this test signal is measured by the controller 104 at the transmit pair of the handset 400. The response to the test signal is an indication of the characteristics of the microphone 404 (FIG. 1) of the handset 400. A plurality of possible microphone characteristics are stored in the table 102, each in association with a corresponding transmit level and, preferably, a corresponding impedance setting. Once the controller 104 locates an entry in the table for measured microphone characteristics, the corresponding transmit level is utilized for adjusting the adjustable amplifier 110 and the corresponding impedance setting is utilized for setting the value of the adjustable impedance 108.

Figure 5:
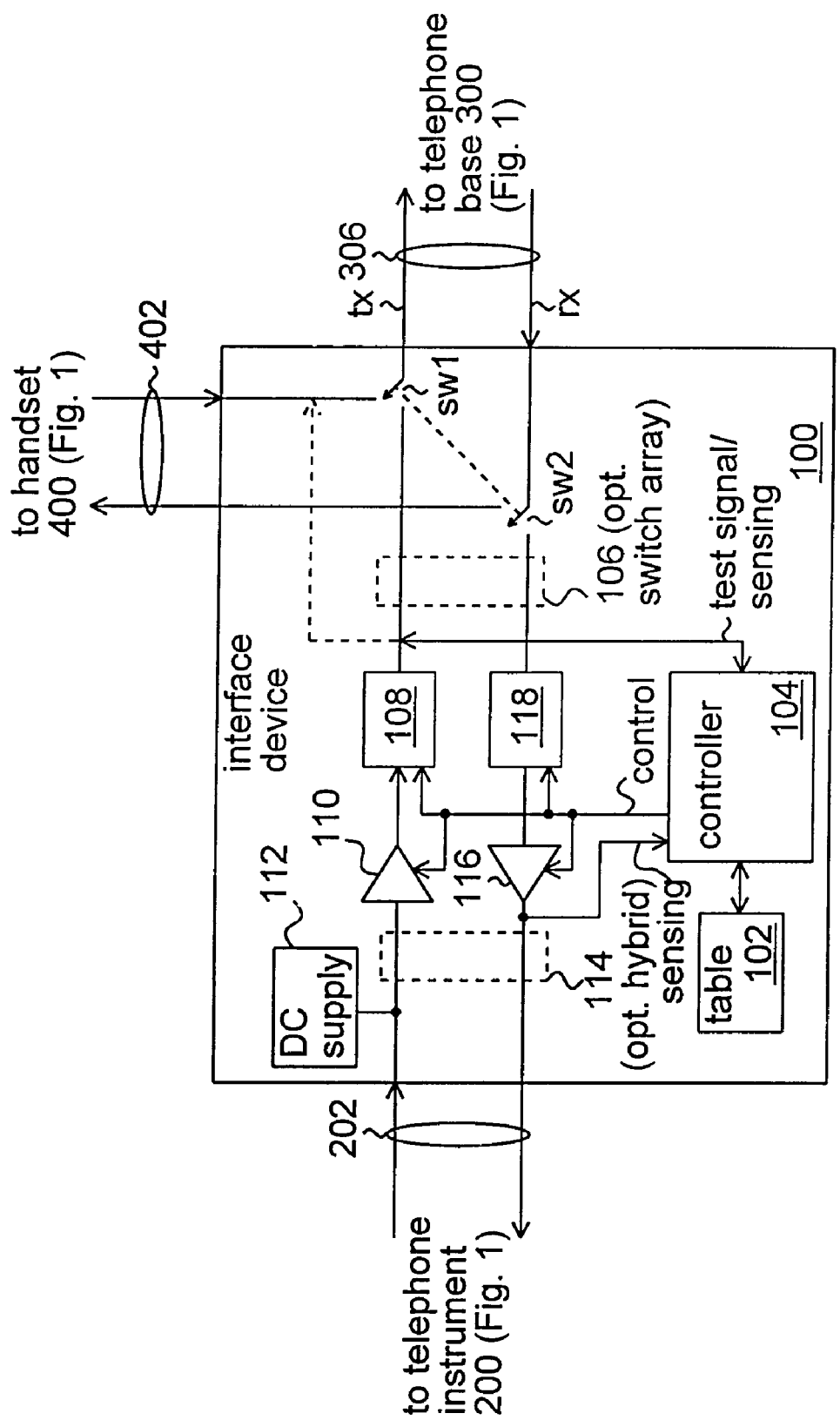
FIG. 5 illustrates a schematic block diagram of the interface device in accordance with a third alternate embodiment of the present invention.

FIG. 5 illustrates a schematic block diagram of the interface device in accordance with a third alternate embodiment of the present invention. In accordance with the third alternate embodiment, received sensitivity for signals received from the speaker port are calibrated. The adjustable amplifier 110 and impedance 108 can be appropriate calibrated in accordance with a technique described herein with reference to FIGS. 1–4.

As illustrated in FIG. 5, an adjustable amplifier 116 and an adjustable impedance 118 are provided in a receive path between the telephone base 300 (FIG. 1) and the telephone instrument 200 (FIG. 1). The controller 104 is coupled to adjust the receive sensitivity level for signals to be provided to the telephone instrument 200 from the telephone base 300 (FIG. 1) by adjusting the amplifier 116. In addition, the controller 104 preferably adjusts the impedance 118. An appropriate level for setting the receive sensitivity can be determined by adjusting the amplifier 116, and possibly also the impedance 118, so that a signal sensed by the controller 104 at the output of the amplifier 116 is within a predetermined range. Accordingly, the controller 104 preferably performs automatic gain control (AGC) for adjusting the receive sensitivity for the interface device 100. Alternately, a signal, such as a dial tone, received from the telephone base 300 (FIG. 1) via the amplifier 116 can be adjusted to a predetermined level by adjusting the amplifier 116 and possibly the impedance 118.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the method of the present invention could be implemented in several different ways and the apparatus disclosed above is only illustrative of the preferred embodiment of the present invention and is in no way a limitation.

What is claimed is:

1. A method of interfacing a telephone instrument to a handset port of a telephone set, the method comprising steps of:
   a. identifying a type of microphone the telephone set is configured to interface with;
   b. correlating the microphone type to an appropriate transmit level for signals transmitted from the telephone instrument to the telephone set via a transmit path;
   c. looking up a DC characteristic in a table wherein the table includes a plurality of entries, each entry including a possible DC characteristic stored in association with a correspondinz transmit level; and
   d. automatically calibrating the transmit path in accordance with the appropriate transmit level, the appropriate transmit level corresponding to the DC characteristic.

2. The method according to claim 1 wherein the step of identifing comprises a step of sensing the DC characteristic of a microphone input of a handset port of the telephone set.

3. The method according to claim 1 wherein the step of identifying comprises steps of:
   a. applying a test signal to a microphone input of a handset port of the telephone set; and
   b. measuring a response to the test signal.

4. The method according to claim 1 wherein the step of identifying comprises steps of:
   a. applying a test signal to a microphone of a handset of the telephone set; and
   b. measuring a response to the test signal.

5. The method according to claim 1 further comprising a step of adjusting an impedance coupled to the handset port in accordance with the microphone type.

6. The method according to claim 1 further comprising a step of calibrating a receive signal path wherein the receive signal path is for signals received by the telephone instrument from the telephone set.

7. The method according to claim 1 further comprising a step of configuring a cross-point switch array positioned in the transmit path.

8. An interface apparatus for interfacing a telephone instrument to a handset port of a telephone set, the interface apparatus comprising:
   a a handset port interface for interfacing to a handset port of a telephone set wherein the handset port includes a microphone input;
   b. a telephone instrument interface for interfacing to a telephone instrument;
   c. a transmit path for communicating signals from the telephone instrument interface to the handset port interface;
   d. a controller for detecting a DC characteristic of the microphone input of the handset port and for adjusting a transmit sensitivity of the transmit path according to the DC characteristic; and
   e. a table wherein the table stores a plurality of predetermined transmit sensitivity levels, each predetermined transmit sensitivity level stored in association with a corresponding DC characteristic.

9. The interface apparatus according to claim 8 wherein the table stores an impedance setting in association with each corresponding DC characteristic.

10. The interface apparatus according to claim 9 further comprising a handset interface for interfacing to a handset.

11. The interface apparatus according to claim 10 wherein the handset port interface is selectively coupled to either the handset interface or the telephone instrument interface by a switching element.

12. The interface apparatus according to claim 11 further comprising a power supply coupled to the telephone instrument interface.

13. The interface apparatus according to claim 12 wherein the switching element is responsive to a current drawn from the power supply.

14. The interface apparatus according to claim 8 further comprising a hybrid coupled to the telephone instrument interface.

15. The interface apparatus according to claim 8 further comprising:
   a. a receive path for communicating signals from the handset port interface to the telephone instrument interface; and
   b. means for calibrating the receive path.

16. The interface apparatus according to claim 8 further comprising a cross-point switch array positioned in the transmit path for coupling the microphone input to the transmit path.

17. An interface apparatus for interfacing a telephone instrument to a handset port of a telephone set, the interface apparatus comprising:
   a. a handset port interface for interfacing to a handset port of a telephone set wherein the handset port includes a microphone input;
   b. a telephone instrument interface for interfacing to a telephone instrument;
   c. a transmit path for commuunicating signals from the telephone instrument interface to the microphone input of the handset port interface;
   d. a controller for applying a test signal to the microphone input of the handset port interface and for measuring a response to the test signal; and
   e. a table wherein the table stores a plurality of predetermined transmit sensitivity levels, each predetermined transmit sensitivity level stored in association with a corresponding possible response to the test signal wherein the controller selects a transmit sensitivity for the transmit path locating an entry in the table corresponding to the response to the test signal.

18. The interface apparatus according to claim 11 wherein the table stores an impedance setting in association with each corresponding possible response to the test signal.

19. The interface apparatus according to claim 17 further comprising a handset interface for interfacing to a handset.

20. The interface apparatus according to claim 19 wherein the handset port interface is selectively coupled to either the handset interface or the telephone instrument interface by a switching element.

21. The interface-apparatus according to claim 20 further comprising a power supply coupled to the telephone instrument interface.

22. The interface apparatus according to claim 21 wherein the switching element is responsive to a current drawn from the power supply.

23. The interface apparatus according to claim 17 further comprising a hybrid coupled to the telephone instrument interface.

24. The interface apparatus according to claim 17 further comprising:
   a. a receive path for communicating signals from the handset port interface to the telephone instrument interface; and
   b. means for calibrating the receive path.

25. The interface apparatus according to claim 17 further comprising a cross-point switch array positioned in the transmit path for coupling the microphone input to the transmit path.

26. An interface apparatus for interfacing a telephone instrument to a handset port of a telephone set, the interface apparatus comprising:
   a. a handset port interface for interfacing to a handset port of a telephone set wherein the handset port includes a microphone input;
   b. a telephone instrument interface for interfacing to a telephone instrument;
   c. a transmit path for communicating signals from the telephone instrument interface to the microphone input of the handset port interface;
   d. a handset interface for interfacing to a handset having a microphone; and
   e. a controller for applying a test signal to the microphone of the handset and for measuring a response to the test signal wherein the controller adjusts a transmit sensitivity of the transmit path according to the response to the test signal, the transmiit sensitivity-corresponding to a DC measurement; and
   f. a table wherein the table stores a plurality of predetermined transmit sensitivity levels each predetermined transmit sensitivity level stored in association with a correspondinig possible response to the test signal.

27. The interface apparatus according to claim 26 wherein the controller measures the response to the test signal at the microphone input of the handset port interface.

28. The interface apparatus accordin to claim 26 wherein the table stores an impedance setting in association with each corresponding possible response to the test signal.

29. The interface apparatus according to claim 26 wherein the handset port interface is selectively coupled to either the handset interface or the telephone instrument interface by a switching element.

30. The interface apparatus according to claim 29 further comprising a power supply coupled to the telephone instrument interface.

31. The interface apparatus according to claim 30 wherein the switching element is responsive to a current drawn from the power supply.

32. The interface apparatus according to claim 26 further comprising a hybrid coupled to the telephone instrument interface.

33. The interface apparatus according to claim 26 further comprising:
   a. a receive path for communicating signals from the handset port interface to the telephone instrument interface; and
   b. means for calibrating the receive path.

34. The interface apparatus according to claim 26 further comprising a cross-point switch array positioned in the transmit path for coupling the microphone input to the transmit path.

* * * * *

UNITED STATES PATENT AND TRADEMARK OFFICE
CERTIFICATE OF CORRECTION

PATENT NO.     : 6,683,949 B1
DATED          : January 27, 2004
INVENTOR(S)    : Bruce W. Stelman It is certified that error appears in the above-identified patent and that said Letters Patent is hereby corrected as shown below:

Column 10,
Line 18, please delete "9" and insert -- 8 --;
Line 65, please delete "11" and insert -- 17 --; and Column 12,
Line 13, please delete "accordin" and insert -- according --.

Signed and Sealed this

Sixth Day of April, 2004

JON W. DUDAS
*Acting Director of the United States Patent and Trademark Office*